United States Patent Office 3,702,332
Patented Nov. 7, 1972

---

3,702,332
N-FURFURYL-MONOPHOSPHORYL ETHYLENE DIAMINES
Daniel Pillon and Jacques Ducret, Lyon, France, assignors to Pechiney-Progil, Lyon, France
No Drawing. Filed Feb. 11, 1970, Ser. No. 10,599
Claims priority, application France, Feb. 20, 1969,
6904575
Int. Cl. C07d 5/16
U.S. Cl. 260—347.7      7 Claims

ABSTRACT OF THE DISCLOSURE

Agricultural pesticides of the general formula:

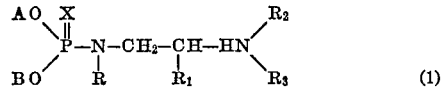

wherein: A and B are identical or different lower alkyl radicals; X is oxygen or sulfur; R, $R_1$, and $R_2$ are hydrogen, or identical or different lower radicals; $R_3$ is either a lower alkyl radical, different from $R_2$, or an alkyl radical substituted by alkoxy, cyano, mono- or dialkylamino, or heterocyclic groups, or else, a cycloaliphatic or aryl radical. $R_2$ and $R_3$ may also form with the nitrogen atom a saturated, eventually substituted heterocycle, which may contain another heteroatom.

---

The present invention relates to new chemical products derived from phosphoroamidic or thiophosphoroamidic acid, of the general formula:

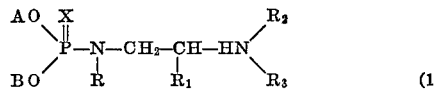

wherein: A and B are identical or different lower alkyl radicals; X is oxygen or sulfur; R, $R_1$, and $R_2$ are hydrogen, or identical or different lower radicals; $R_3$ is either a lower alkyl radical, different from $R_2$, or an alkyl radical substituted by alkoxy, cyano, mono- or dialkylamino, or heterocyclic groups, or else, a cycloaliphatic or aryl radical. $R_2$ and $R_3$ may also form with the nitrogen atom a saturated, eventually substituted heterocycle, which may contain another heteroatom.

The present invention relates also to a method for preparing such compounds, as well as to their use as agricultural pesticides, namely, as insecticides and fungicides.

For many years, phosphorus derivative chemistry has given rise to a very great number of reports and patents, among which those relating to phosphoroamidic or thiophosphoroamidic acid derivatives are prominent.

On the other hand, reports relating to phosphoroamidic derivatives including one amine radical in the carbon chain directly bonded to nitrogen are much fewer in number. Most of them were published by P. Grechkin, who, in particular, has obtained compounds fairly close to those of the present invention, by condensing phosphoric acid chlorides on ethyleneimine, and then acting on an amine with the cyclic phosphoroamide thus obtained. By using comparatively long reaction times and strong heating, the cycle then opens, and phosphoroamidic compounds form, according to the following equations:

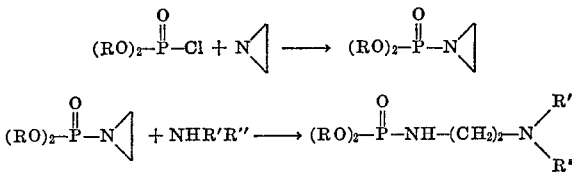

Furthermore, this reation process uses a compound, that is, ethyleneimine, the use of which is critical, owing to the sterilizing properties thereof. The said process, besides, has been applied only to a small number of amines, and the number of compounds obtained thereby is limited. About this subject, one may refer in particular to.

Chemical Abstracts, vol. 59, p. 5194a
Chemical Absrtatcts, vol. 52, p. 241a
Chemical Abstracts, vol. 51, p. 1933a Now, the work of the applicants have brought out the possibility of preparing very numerous phosphoroamidic derivatives having an amine radical in the carbon chain directly bonded to nitrogen, by using a wholly different method, according to the following equations:

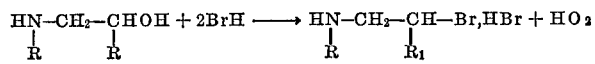

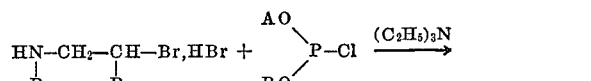

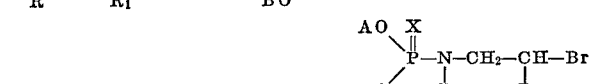

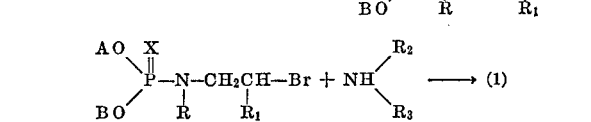

It will be seen that this method uses more readily available raw materials, in particular alkanolamines, for producing the corresponding N-$\beta$-bromoalkyl phosphoroamides, and that it is then only necessary to condense said derivatives with mono- or di-substituted amines to obtain the compounds according to the invention, many various amines being adapted for this purpose. It may be noted that the method of the invention makes it possible to prepare derivatives containing a substituent, R, on the nitrogen atom, while the method using ethyleneimine does not allow to do so.

Furthermore, in contrast to the method of P. Grechkin, the method of the invention does not require opening a cycle, so that the reaction times are substantially reduced. This simplified reaction enables, besides, compounds to be prepared, wherein $R_2$ and $R_3$ may vary widely, while the compounds prepared by P. Grechkin were more simple compounds, wherein $R_2$ and $R_3$ were always identical alkyl or alkenyl radicals.

(1) Preparation of N-$\beta$-bromoalkyl phosphoroamide

These compounds are obtained by acting on the bromohydrate of the $\beta$-bromoalkylamine with a chloride of dialkyl phosphoric or thiophosphoric acid, in the presence of an acceptor for the HCl and/or HBr acid halide released, such as tertiary amines (pyridine, trialkylamine, and the like), in an organic medium constituted, for instance, by aliphatic or aromatic hydrocarbons, such as benzene, toluene, chloroform, carbon tetrachloride, and the like, which may be halogenated.

The organic medium may, besides, be constituted by the acid acceptor itself. The reaction is generally carried out at room temperature, but may be speeded up by heating it slightly. The reaction is carried on rapidly, with good yields.

Example 1.—Preparation of N-$\beta$-bromoethyl-O,O-diethylphosphoroamide 86.2 g. (0.5 mole) of diethylchlorophosphate and 102 g. (0.5 mole) of $\beta$-bromoethylamine bromohydrate are suspended in chloroform inside a three-necked flask. 111 g. (1.1 mole) of triethylamine dissolved in a little chloroform are then added to the mixture through the pouring funnel, while keeping the temperature at about 20° C. The mixture is then allowed to react for two hours at room temperature, after which the chloroform solution is washed with distilled water until completely free from Br⁻ and Cl⁻ ions, and the organic phase is dried over magnesium sulfate. Chloroform is then removed under the water-pump vacuum in a first stage, and then for 1 hour under a higher vacuum.

There are thus obtained 116 g. (yield, 91%) of a colourless oil, which is N-β-bromoethyl-O,O-diethyl-phosphroamide; $n_D^{20}=1.4668$.

A similar method was used for obtaining the following N-β-bromoalkyl phosphoroamides, which are synthesized intermediates for preparing the compounds according to the invention, and are listed in Table I below:

TABLE I $$\begin{array}{c} AO \\ \diagdown \\ BO \diagup \underset{X}{\overset{\|}{P}} - \underset{R}{N} - CH_2 \underset{R_1}{CH} - Br \end{array}$$

| A | B | X | R | R₁ | Yield, percent | Index, $n_D^{20}$ |
|---|---|---|---|---|---|---|
| CH₃ | CH₃ | O | H | H | 60 | 1.4776 |
| CH₃ | CH₃ | O | CH₃ | H | 78.5 | 1.4690 |
| CH₃ | CH₃ | O | H | CH₃ | 78 | 1.4742 |
| C₂H₅ | C₂H₅ | S | H | H | 56 | 1.4795 |
| C₂H₅ | C₂H₅ | O | CH₃ | H | 89 | 1.4595 |
| C₂H₅ | C₂H₅ | O | H | CH₃ | 81 | 1.4650 |
| nC₃H₇ | nC₃H₇ | O | CH₃ | H | 86 | 1.4585 |
| isoC₃H₇ | isoC₃H₇ | O | H | H | 97 | (1) |
| isoC₃H₇ | isoC₃H₇ | O | H | CH₃ | 88 | 1.4552 |

¹ M.P., 40°.

General method for effecting condensation with amines

The compounds of the invention are prepared by acting on a mono- or disubstituted amine with the N-haloalkyl phosphoroamides previously defined hereinabove.

The reaction is advantageously carried out in an organic medium, such as alcohol, chloroform, or acetonitrile, in the optional presence of an acid halide acceptor such as described hereinabove. In some cases the acceptor may be the amine itself, used in excess. The reaction takes place mildly at temperatures ranging from 0° to 100° C., and preferably from 40° to 60° C.

Upon completion of the reaction, the compound is separated after being purified by conventional methods, such as filtration, washing, and distillation. The compounds thus obtained appear generally as clear oils.

Example 2.—Preparation of N(O,O-diethylphosphoryl) N-methyl N'-methyl N'-isobutyl ethylenediamine

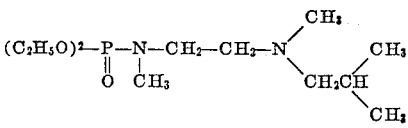

0.03 mole (8.2 g.) of N-β-bromoethyl-N-methyl-O,O-diethylphosphoroamide and 0.066 mole (5.75 g.) of methyl-isobutylamine in 30 ml. of chloroform are put into a thick glass reactor, which is then completely sealed. The mixture is heated up to 50° C. for 9 hours, and then cooled. The reaction mixture is washed three times with 50 ml. of distilled water till the Br⁻ ions are removed. The organic phase is dried over anhydrous magnesium sulfate. Chloroform is distilled off under the water-pump vacuum, and the remaining oil is distilled under a high vacuum.

6.8 g. (Yield: 81%) of a colourless liquid are obtained; B.P./0.12 mm.=85° C.; $n_D^{20}$: 1.4390.

Percentage analysis.—Calculated (percent): C, 51.42; H, 10.35; N, 10.00; P, 11.07. Found (percent): C, 51.31; H, 10.16; N, 9.81; P, 11.22.

By using similar methods, and condensing with various amines the N - β - bromoalkyl - O,O - dialkylphosphoroamides apearing in Table I, the following compounds are obtained:

TABLE II

| Product No. | A | B | X | R | R₁ | R₂ | R₃ | Boiling point | Index, $n_D^{20}$ | Yield percen |
|---|---|---|---|---|---|---|---|---|---|---|
| 1 | CH₃ | CH₃ | O | H | H | CH₃ | −CH(CH₃)(CH₂CH₃) | B.P./0.05=115°-116° | 1.448 | 83 |
| 2 | C₂H₅ | C₂H₅ | O | H | H | CH₃ | (CH₂)₃—CH₃ | B.P./0.4=119° | 1.4425 | 52 |
| 3 | C₂H₅ | C₂H₅ | O | H | H | CH₃ | CH₂—CH(CH₃)₂ | B.P./0.2=119° | 1.4409 | 70 |
| 4 | isoC₃H₇ | isoC₃H₇ | O | H | H | CH₃ | —CH(CH₃)₂ | B.P./0.13=105° | 1.4388 | 44 |
| 5 | isoC₃H₇ | isoC₃H₇ | O | H | H | CH₂—CH₃ | n—C₄H₉ | B.P./0.1=111° | 1.4400 | 68.5 |
| 6 | isoC₃H₇ | isoC₃H₇ | O | H | H | H | CH(CH₃)CH₂CH₃ | B.P./0.05=120° | 1.4400 | 32 |
| 7 | isoC₃H₇ | isoC₃H₇ | O | H | H | H | CH₃ | B.P./0.05=105° | | 14 |
| 8 | isoC₃H₇ | isoC₃H₇ | O | H | H | CH₃ | (CH₂)₂CH₃ | B.P./0.05=104° | 1.4400 | 77.5 |
| 9 | isoC₃H₇ | isoC₃H₇ | O | H | H | CH₃ | CH₂CH(CH₃)₂ | B.P./0.08=104°-105° | 1.4360 | 75 |
| 10 | C₂H₅ | C₂H₅ | O | CH₃ | H | CH₃ | CH(CH₃)₂ | B.P./0.08=82° | 1.4425 | 76.5 |
| 11 | C₂H₅ | C₂H₅ | O | CH₃ | H | CH₃ | CH₂CH(CH₃)₂ | B.P./0.12=85° | 1.4390 | 81 |
| 12 | C₂H₅ | C₂H₅ | O | CH₃ | H | CH₃ | (CH₂)₂CH₃ | B.P./0.02=81°-82° | 1.4395 | 77.5 |
| 13 | C₂H₅ | C₂H₅ | O | CH₃ | H | H | CH₃ | B.P./0.3=70° | 1.4405 | 58.2 |
| 14 | n—C₃H₇ | n—C₃H₇ | O | CH₃ | H | H | CH₃ | B.P./0.13=86°-87° | 1.4425 | 65 |
| 15 | n—C₃H₇ | n—C₃H₇ | O | CH₃ | H | CH₃ | CH(CH₃)₂ | B.P./0.06=.94° | 1.4430 | 72.8 |
| 16 | n—C₃H₇ | n—C₃H₇ | O | CH₃ | H | CH₃ | CH₂CH(CH₃)₂ | B.P./0.1=100° | 1.4400 | 72.5 |
| 17 | n—C₃H₇ | n—C₃H₇ | O | CH₃ | H | CH₃ | (CH₂)₂CH₃ | B.P./0.07=99° | 1.4410 | 66 |
| 18 | CH₃ | CH₃ | O | H | H | CH₃ | (CH₂)₃—OCH₃ | B.P./0.1=128° | | 15.8 |
| 19 | isoC₃H₇ | isoC₄H₇ | O | H | H | CH₃ | (CH₂)₃—OCH₃ | B.P./0.05=119° | 1.4429 | 75.2 |
| 20 | isoC₃H₇ | isoC₃H₇ | O | H | H | CH₂ | (CH₂)₃—OCH₃ | B.P./0.06=115° | 1.4435 | 70 |
| 21 | C₂H₅ | C₂H₅ | O | CH₃ | H | CH₃ | (CH₂)₃—OCH₃ | B.P./0.12=107° | 1.4450 | 74 |
| 22 | n—C₃H₇ | n—C₃H₇ | O | CH₃ | H | CH₃ | (CH₂)₃—OCH₃ | B.P./0.07=117° | 1.4460 | 68 |
| 23 | C₂H₅ | C₂H₅ | S | H | H | CH₃ | (CH₂)₂—OCH₃ | B.P./0.08=115° | 1.4805 | 22.4 |
| 24 | C₂H₅ | C₂H₅ | O | H | H | CH₃ | (CH₂)₂—CN | | 1.4602 | 70 |
| 25 | C₂H₅ | C₂H₅ | O | H | H | H | (CH₂)₄—N(CH₃)₂ | | 1.4578 | 20.4 |
| 26 | isoC₃H₇ | isoC₃H₇ | O | H | H | H | (CH₂)₃—N(CH₃)₂ | B.P./0.09=117° | 1.4485 | 29.4 |
| 27 | C₂H₅ | C₂H₅ | O | CH₃ | H | H | (CH₂)₃—N(CH₃)₂ | B.P./0.13=110° | 1.4500 | 42.6 |
| 28 | n-C₃H₇ | n-C₃H₇ | O | CH₃ | H | H | (CH₂)₃—N(CH₃)₂ | B.P./0.15=116° | 1.4495 | 40 |
| 29 | isoC₃H₇ | isoC₃H₇ | O | H | H | H | CH₂-furfuryl | B.P./0.1=158° | 1.4712 | 51.2 |
| 30 | C₂H₅ | C₂H₅ | O | CH₃ | H | H | Same as above | B.P./0.1=125° | 1.4740 | 41.5 |
| 31 | nC₃H₇ | n-C₃H₇ | O | CH₃ | H | H | do | B.P./0.15=117° | 1.4670 | 35.8 |
| 32 | isoC₃H₇ | isoC₃H₇ | O | H | H | H | phenyl-H | B.P./0.2=143° | 1.4617 | 61.5 |
| 33 | C₂H₅ | C₂H₅ | O | CH₃ | H | H | Same as above | B.P./0.1=119° | 1.4640 | 49.2 |
| 34 | nC₃H₇ | n-C₃H₇ | O | CH₃ | H | H | do | B.P./0.15=118° | 1.4620 | 56.5 |

TABLE II—Continued

| Product No. | A | B | X | R | R₁ | R₂ | R₃ | Boiling point | Index, $n_D^{20}$ | Yield, percent |
|---|---|---|---|---|---|---|---|---|---|---|
| 35 | isoC₃H₇ | isoC₃H₇ | O | H | H | H | —⟨phenyl⟩ | B.P./0.2=178° | 1.5095 | 60 |
| 36 | CH₃ | CH₃ | O | H | H | | —N⟨piperidine with C₂H₅ and CH₃⟩ | B.P./0-06=135°–138° | 1.4680 | 40.8 |
| 37 | CH₃ | CH₃ | O | H | H | | —N⟨morpholine⟩ | B.P./0.12=136° | 1.4720 | 11.2 |
| 38 | C₂H₅ | C₂H₅ | O | H | H | | —N⟨morpholine⟩ | B.P./0.15=140° | 1.4650 | 79 |
| 39 | C₂H₅ | C₂H₅ | O | H | H | | —N⟨piperidine⟩ | B.P./0.2=125° | 1.4637 | 80 |
| 40 | isoC₃H₇ | isoC₃H₇ | O | H | H | | —N⟨piperidine⟩ | B.P./0.09=115° | 1.4575 | 73.5 |
| 41 | isoC₃H₇ | isoC₃H₇ | O | H | H | | —N⟨morpholine⟩ | BP./0.04=126° | 1.4570 | 60 |
| 42 | C₂H₅ | C₂H₅ | O | CH₃ | H | | —N⟨morpholine⟩ | BP./0.04=110° | 1.4595 | 74 |
| 43 | C₂H₅ | C₂H₅ | O | CH₃ | H | | —N⟨piperidine⟩ | B.P./0.1=103° | 1.4580 | 75.5 |
| 44 | nC₃H₇ | nC₃H₇ | O | CH₃ | H | | —N⟨morpholine⟩ | B.P./0.03=113–114° | 1.4590 | 67.5 |
| 45 | nC₃H₇ | nC₃H₇ | O | CH₃ | H | | —N⟨piperidine⟩ | B.P./0.05=101°–102° | 1.4590 | 69.7 |
| 46 | nC₃H₇ | nC₃H₇ | O | CH₃ | H | | —N⟨piperidine with C₂H₅ and CH₃⟩ | B.P./0.035=119° | 1.4595 | 65 |
| 47 | C₂H₅ | C₂H₅ | O | H | CH₃ | | —N⟨morpholine⟩ | B.P./0.4=161° | 1.4630 | 38.4 |

The compounds according to the invention have parasiticide, in particular insecticide and fungicide, properties much better than those of the related compounds previously known, as appears from the following examples:

(A) TESTS FOR INSECTICIDE ACTIVITY

Example.—Test on wheat weevils 5 ml. of an acetone solution of the active material concerned are laid on a glass plate by means of a sprayer.

After evaporation of the solvent, 100 adult weevils (*Calandra granaria*) are laid on the glass plate and kept thereon for 2 hours.

The weevils are then put inside Petri boxes for a period of 10 days, during which normal food is supplied to them. During the said period, periodical checks are effected to evaluate the number of dead, intoxicated, or normal weevils.

Under such conditions, the results obtained with some of the compounds according to the invention are given in the table below, which shows the death rate after 10 days. For the purpose of comparison, the said table includes some compounds wherein the two radicals bonded to the nitrogen atom of the amine are identical. These compounds are:

(A)
$$(C_2H_5O)_2\text{—}\overset{\overset{O}{\|}}{P}\text{—NH—}(CH_2)_2\text{—N}(C_2H_5)_2$$

(B)
$$(isoC_3H_7O)_2\text{—}\overset{\overset{O}{\|}}{P}\text{—NH—}(CH_2)_2\text{—N}(CH_3)_2$$

(C)
$$(isoC_3H_7O)_2\text{—}\overset{\overset{O}{\|}}{P}\text{—NH—}(CH_2)_2\text{—N}(C_2H_5)_2$$

| Product used | Concentration | |
|---|---|---|
| | 10⁻² | 10⁻³ |
| Known: | | |
| A, percent | 50 | 0 |
| B, percent | 50 | 0 |
| C, percent | 0 | 0 |
| Product of the invention: | | |
| No. 16, percent | 100 | 100 |
| No. 23, percent | 100 | 100 |

Example.—Test on flour mites

A few drops of a solution of active material in acetone are poured onto a cachet made of azyme as used in pharmacy. After evaporation of the solvent, 10 eggs of *Ephestia kuhniella* are disposed in each cachet, and are covered with a slide to prevent any flight. Reference cachets are prepared in the same way, but are not wetted with the solution. In these latter cachets, hatching out begins after 4 or 5 days.

Checks are effected after 10 days, so as to obtain the percentage of hatched eggs, and the percentage of dead larvae among all the hatched eggs.

The results are given in the table below, which indicates the death rates with the products tested. For the purpose of comparison, the said table includes the same reference compounds as in the previous example.

| Products used | Death rate with a concentration of— | |
|---|---|---|
| | (2) 10⁻³ | (5) 10⁻⁴ |
| Known: | | |
| A, percent | 50 | 0 |
| B, percent | 50 | 0 |
| C, percent | 0 | 0 |
| Product of the invention: | | |
| No. 5, percent | 100 | 50 |
| No. 7, percent | 100 | 70 |
| No. 23, percent | 100 | 100 |
| No. 25, percent | 100 | 80 |
| No. 29, percent | 100 | 85 |

Example.—Test on Acaridae

Disks about 2 cm. in diameter are cut out in a bean leaf highly infested with *Tetranychus urticae*, and are then sprayed with an acetone solution of the active material under study, at the concentration desired.

After 2 days, the resulting death rate is observed by means of a binocular magnifying lens.

Under such conditions, product No. 16 causes the death of all the Acaridae at a dose of 0.1 g./l.

In the same test, the 4 reference products cause no deaths, neither at a dose of 0.1 g./l. nor even at a dose ten times higher.

(B) TESTS FOR FUNGICIDAL ACTIVITY (1) Tests on living plants

A wettable powder containing 20% of active material is prepared by mixing intimately the following compounds for one minute in a blade mill:

| | Percent |
|---|---|
| Active material to be tested | 20 |
| Deflocculating agent (calcium lignosulfate) | 5 |
| Wetting agent (sodium alkylaryl sulfonate) | 1 |
| Filler (alumina silicate) | 74 |

The plant is then treated with a wash prepared from this wettable powder diluted in a manner such that the wash contains 2 g./l. of the product.

The plant is then infected with spores of the fungus selected, and after 10 days the fungicidal action of the active material under study is noted.

(a) Under such conditions, products Nos. 8 and 23 provide complete protection against *Erisyphe graminis*, which is the cause of wheat mildew.

(b) Under the same conditions, products Nos. 10, 23, and 31 provide very good protection against *Septoria apii*, a fungus which is the cause of septoriosis in celery.

(c) Under the same conditions, product No. 23 provides complete protection against *Uromyces appendiculatus*, a fungus which is the cause of the bean brown rot.

(2) Tests on vine leaves

A suspension is prepared, which contains both mildew conidia and the active material under study at the required concentration. Drops of the said suspension are deposited on vine leaves still alive.

Under such conditions, and at a dose of 0.01 g./l., products Nos. 12, 14, 16, and 34 provide complete protection against *Plasmopara viticola*, a fungus which is the cause of the vine mildew.

In all the fungicidal tests previously mentioned, none of the reference products has a fungicidal action at the doses tested, and even at definitely higher doses.

As a whole, the results indicated hereinabove demonstrate that the products according to the invention are very advantageous, and constitute a technical advance with respect to the products of the prior art.

What we claim is:

1. A phosphoryl derivative of ethylene diamine of the formula

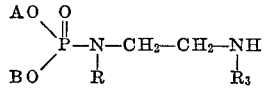

wherein A and B are alkyl of 1–3 carbon atoms; R is hydrogen or methyl; and $R_3$ is furfuryl.

2. Compound according to claim 1 wherein R is —H and A and B are -iso $C_3H_7$.

3. Compound according to claim 1 wherein R is —$CH_3$.

4. Compound according to claim 3 wherein A is —$C_2H_5$.

5. Compound according to claim 3 wherein A is —$nC_3H_7$.

6. Compound according to claim 4 wherein B is —$C_2H_5$.

7. Compound according to claim 5 wherein B is —$nC_3H_7$.

References Cited

Atherton et al., Chem. Abstracts (1946), vol. 40, 180.

ALEX MAZEL, Primary Examiner

B. DENTZ, Assistant Examiner

U.S. Cl. X.R.

260—247.1, 247.5, 293.85, 293.82, 940, 944, 945, 959; 424—200, 203, 210, 211, 219, 220